United States Patent [19]

Lopperi

[11] Patent Number: 5,072,949
[45] Date of Patent: Dec. 17, 1991

[54] LIQUID-FLUSHED SEAL FOR ROTATING SHAFT WITH VACUUM PROVIDING LEAKAGE CONTROLLING CHOKE IN FLUSHING LIQUID SUPPLY CONDUIT

[75] Inventor: Esko Lopperi, Jyväskylä, Finland
[73] Assignee: Safematic Ltd., Muurame, Finland
[21] Appl. No.: 642,696
[22] Filed: Jan. 15, 1991

Related U.S. Application Data

[63] Continuation of Ser. No. 407,197, Sep. 14, 1989, abandoned.

[30] Foreign Application Priority Data

Dec. 21, 1988 [FI] Finland ................... 885925

[51] Int. Cl.⁵ .................... F16J 15/34; F16J 15/40
[52] U.S. Cl. ........................... 277/3; 277/71; 277/72 R; 277/81 R
[58] Field of Search ............. 277/3, 15, 81 R, 93 SD, 277/93 R, 79, 72 R, 71

[56] References Cited

U.S. PATENT DOCUMENTS 3,356,378 12/1967 Tracy .................. 277/81 R
4,245,844 1/1981 Pohl et al. ............ 277/3
4,538,821 9/1985 Wallace ............... 277/81 R Primary Examiner—Allan N. Shoap
Attorney, Agent, or Firm—Cushman, Darby & Cushman

[57] ABSTRACT

The invention relates to an arrangement in a mechanical seal. The mechanical seal comprises a seal member to be attached to a rotating machine part and provided with a slide ring; and a static seal member to be attached to a stationary machine part and provided with a slide ring. The mechanical seal further comprises connections for supplying flushing liquid to the seal and for discharging it from the seal; and a secondary seal arranged to seal the gap between the rotating machine part and the static seal member. In order to achieve a simple seal reliable in operation, a choke is formed in the flow conduit of the supply connection for flushing liquid, the choke communicating by means of a suction connection with a space receiving the flushing liquid leaking across the secondary seal. The flushing liquid flowing in the supply connection creates, in a manner known per se, a vacuum in the choke, which vacuum is arranged to suck the flushing liquid leaking across the secondary seal through the suction connection into the supply connection.

1 Claim, 1 Drawing Sheet

LIQUID-FLUSHED SEAL FOR ROTATING SHAFT WITH VACUUM PROVIDING LEAKAGE CONTROLLING CHOKE IN FLUSHING LIQUID SUPPLY CONDUIT

This is a continuation of application Ser. No. 07/407,197, filed on Sept. 14, 1989, now abandoned.

BACKGROUND OF THE INVENTION

The invention relates to a mechanical seal arrangement comprising a seal member to be attached to a rotating machine part and provided with a slide ring. A static seal member is provided to be attached to a stationary machine part and provided with a slide ring. The seal members are fitted in place in such a manner that the slide faces of the slide rings are pressed axially against each other. Connections for supplying flushing liquid to the seal and for discharging it from the seal are provided. A secondary seal is arranged to surround the rotating machine part and to seal the gap between the rotating machine part and the static seal member.

These kinds of arrangements and seals are today widely used in various technical fields, e.g., for sealing pump shafts.

In mechanical seals to be flushed with a liquid, such as water, it is customary to suitably regulate the flow of the flushing water by means of a valve upstream in the flushing water supply conduit from where the flow of flushing water is introduced into the seal. No significant back pressure occurs on the discharge side, that is, on the side where the water flows out of the seal. The function of the flushing water introduced into the seal is to cool and lubricate the slide faces of the slide rings which are provided between static and rotating portions of the seal arrangement. The pressure of the water inside the seal is low, generally only equivalent to the flow resistance of the pipe system. Pressure within the seal should not rise too high, otherwise the slide faces of the seal are opened. This is due to the fact that the seals are usually so designed as to be closed by the pressure of the product to be pumped.

A problem with this type of seal is the secondary seal, that is, sealing between the rotating shaft and the static seal member. With greater flush water flow volumes in particular, piping resistances create such a high pressure within the seal that the secondary seal leaks.

For example, an annular gap has been used in the prior art in connection with the secondary seal in mechanical seals, whereby the secondary seal surrounds the shaft with a small clearance. A drawback of this prior art solution is its poor resistance to pressure or its great length and narrow clearance.

Another example is the use of a V-ring in connection with the secondary seal. A drawback of this solution is poor wear strength and excessively low pressure resistance, with the resultant risk of the slide faces being opened. A further problem is that the solution requires the use of flush water for operation.

Still another example of the prior art is the use of a radial lip seal called "stefa", in connection with the secondary seal. A drawback of this solution is its poor wear strength, which is affected by the high rates of rotation and the use of water as a lubricant. A further drawback is that the radial lip seal exposes the shaft to wear. Further, this solution provides too high a pressure resistance, with the resultant risk of the slide faces being opened. Still another drawback is that the seal requires, constant supply of water.

SUMMARY OF THE INVENTION

An object of the invention is to provide an arrangement by means of which the drawbacks of the prior art can be eliminated. This is achieved by means of an arrangement according to the invention, which is characterized in that a choke is formed in the flow conduit of the supply connection for flushing liquid, the choke communicating by means of a suction connection with a space receiving the flushing liquid leaking across the secondary seal, whereby the flushing liquid flowing in the supply connection creates, by using the well-known Bernoulli effect, a vacuum in the choke, the vacuum being arranged to suck the flushing liquid leaking across the secondary seal, through the suction connection, into the supply connection.

An advantage provided by the arrangement of the invention is that the structure is substantially unaffected by wear, since the secondary seal does not make contact with the shaft. A further advantage is that the clearance between the secondary seal and the shaft can be made larger than previously, and the secondary seal can be made shorter than previously. Still another advantage is that the vacuum line provided in accordance with the invention is self-adjusting and the slide faces are not opened even at high pressures. Furthermore, the apparatus provided for practicing the invention will not be damaged even if the supply of water into the seal were to be interrupted for one reason or another. The arrangement provided by the present invention is also simple, which results in reliable operation and low cost of manufacture, which is a marked advantage over double-action seals.

BRIEF DESCRIPTION OF THE DRAWING

In the following section of the specification the invention will be described with reference to a preferred embodiment which is shown in the attached drawing, wherein.

DETAILED DESCRIPTION

Figure 1:
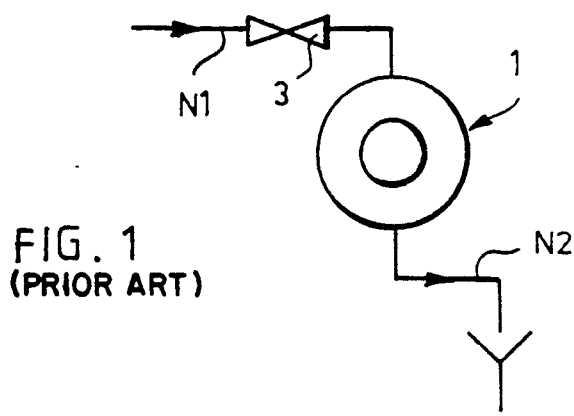
FIG. 1 illustrates generally the operating principle of a mechanical seal flushed with liquid.

FIG. 1 shows the general arrangement of a mechanical seal flushed with liquid. In FIG. 1, the mechanical seal is indicated generally with the reference numeral 1. A supply flow of flushing liquid, such as water, is indicated by the arrow N1 and a discharge flow by the arrow N2, respectively. A valve for regulating the flow of flushing water is indicated by the reference numeral 3.

Inasmuch as the structure and operation of the features which are shown in FIG. 1 would be well known to a person skilled in the art, they will not be described in greater detail herein.

Figure 2:
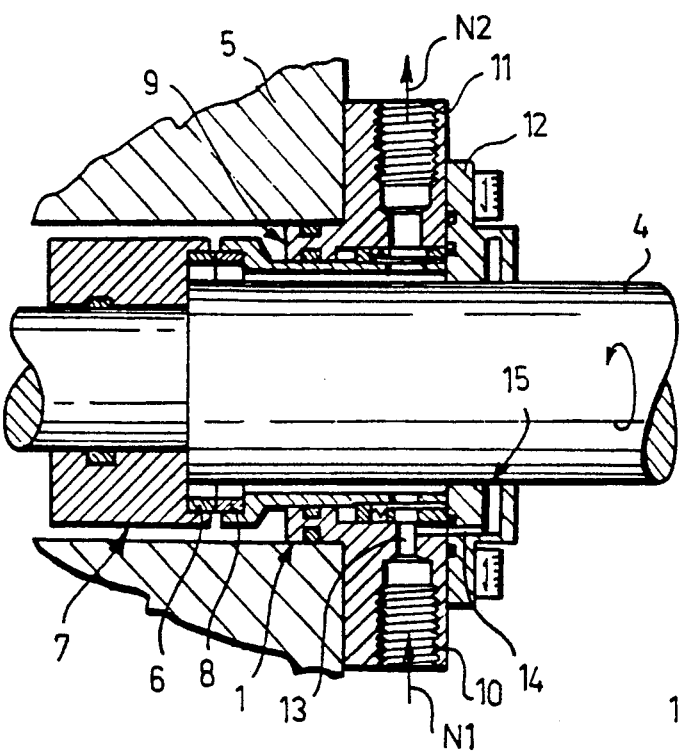
FIG. 2 is a side view of a mechanical seal applying the arrangement of the invention.

FIG. 2 shows a rotating shaft 4 sealed relative to a stationary machine part 5, such as the body of a pump, by means of a mechanical seal 1. The mechanical seal 1 comprises a seal member 7 attached to the shaft 4 and provided with a slide ring 6, and a static seal member 9 attached to the stationary machine part 5 and provided with a slide ring 8. The seals 7 and 9 are fitted in place in such a manner that the slide faces of the slide rings 6, 8 are pressed axially against each other.

The mechanical seal 1 further comprises a connection 10 for a flushing water supply conduit and, correspondingly, another connection 11 for a flushing water discharge conduit. The flushing water supply and discharge flows are indicated similarly as in FIG. 1.

To seal the gap between the rotating shaft 4 and the static seal member 9, the mechanical seal 1 comprises a secondary seal 12.

Figure 3:
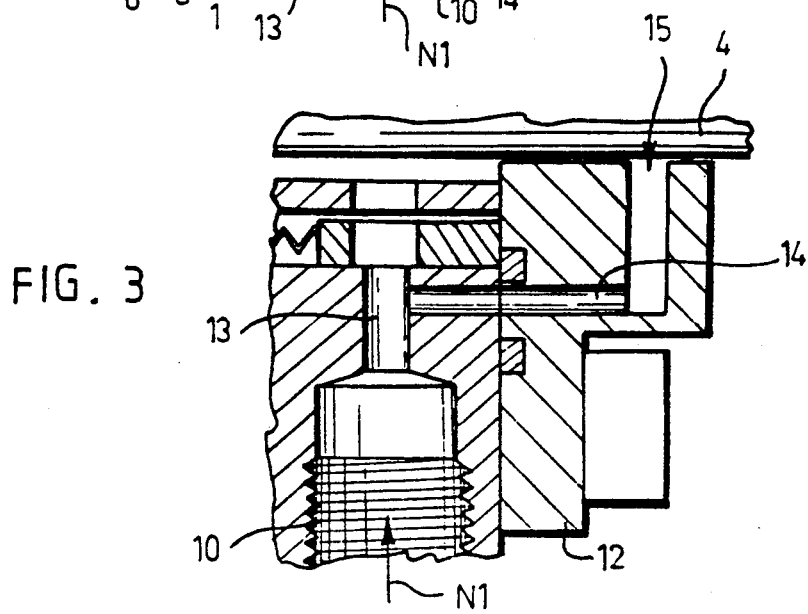
FIG. 3 is an enlarged view of a detail of FIG. 2.

According to the invention, the flushing water supply flow conduit is provided with a choke 13. The choke 13 communicates through a suction connection 14 with a space 15 receiving the flushing liquid leaking across the secondary seal 12. These details appear clearly from FIG. 3.

The choke 13 provided in the flushing water flow conduit increases the water flow rate, thus causing a pressure drop in the suction connection 14. This creates a suction effect in the suction connection, as a result of which the possible leakage water is sucked from the space 15 into the supply water flow conduit.

With this structure, the clearance between the secondary seal 12 and the shaft 4, for instance, need not be as narrow as conventionally necessary and, nevertheless, a sufficient sealing effect is obtained. It is further to be noted that if the water flow volume is increased in the flushing water supply conduit, the suction effect is increased, that is, the seal is self-adjusting.

The above example is by no means intended to restrict the invention, but the invention can be modified freely within the scope of the claims. Accordingly, it is clear that the arrangement provided by the invention or its parts need not be exactly similar to those shown in the drawing figures, but other solutions are possible as well. For example, the choke need not be positioned in connection with the seal as in the figures. It can be positioned in a part outside the seal, whereby the choke is connected by means of a pipe, e.g., to the space receiving the flushing water leaking across the secondary seal and the shaft clearance. The suction connection need not terminate in a groove formed in the secondary seal as in the figures; instead, it can be arranged to terminate in the clearance without any groove. If a groove is used similarly as in the figures, its shape and size may vary according to the requirements in each particular case.

I claim:

1. In a seal arrangement for a mechanical assembly which includes a rotary shaft circumferentially surrounded by a stationary body, the rotary shaft having a rotary slide ring disposed in sliding sealing engagement with a static slide ring provided on said stationary body, a secondary seal circumferentially surrounding the rotary shaft at a site that is axially spaced from said slide rings, said secondary seal being slightly radially spaced from said shaft so as to provide an annular gap defining an annular path of possible leakage axially past said secondary seal, the rotary shaft and the stationary body including surface means defining radially between them a flushing liquid chamber which is delimited at one end by said secondary seal, means spacing said slide rings from said rotary shaft so that slidingly engaging faces of said slide rings are operatively exposed to said chamber, means defining a flushing liquid line intersecting said flushing liquid chamber and including a flushing liquid supply conduit to said flushing liquid chamber and a flushing liquid discharge conduit from said chamber, wherein, in use, as said rotary shaft is rotating, and flushing liquid is being supplied to said flushing liquid chamber through said supply conduit and thereby lubricating said engaging faces of said slide rings, and being discharged from said flushing liquid chamber through said discharge conduit, some of the flushing liquid will tend to leak out of said flushing chamber through said annular gap between said secondary seal and said rotary shaft, an improvement for reducing such flushing liquid leakage, comprising:

said supply conduit having a throttling choke upstream of said flushing liquid chamber; and a suction conduit communicating between said annular gap and said choke, remote from said flushing liquid chamber, so that, in use, the flow of flushing liquid through said flushing liquid supply conduit into said flushing liquid chamber, due to temporarily increased velocity while flowing axially through said choke, creates a partial vacuum in said suction conduit and thereby draws into said flushing liquid supply conduit and forwards into said flushing liquid chamber flushing liquid which previously has leaked from said flushing liquid chamber into said annular gap.

* * * * *